(12) United States Patent
Kimura et al.

(10) Patent No.: US 8,148,865 B2
(45) Date of Patent: Apr. 3, 2012

(54) PERMANENT MAGNET ROTATING ELECTRICAL MACHINE AND PERMANENT MAGNET ROTATING ELECTRICAL MACHINE SYSTEM

(75) Inventors: Mamoru Kimura, Hitachi (JP);
Daisuke Kori, Hitachinaka (JP);
Hiroyuki Mikami, Hitachinaka (JP);
Seikichi Masuda, Hitachi (JP);
Masayasu Fujieda, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 413 days.

(21) Appl. No.: 12/170,592

(22) Filed: Jul. 10, 2008

(65) Prior Publication Data

US 2009/0015090 A1    Jan. 15, 2009

(30) Foreign Application Priority Data

Jul. 11, 2007   (JP) ................. 2007-182002

(51) Int. Cl.
*H02K 21/26*    (2006.01)
(52) U.S. Cl. .......... 310/156.38; 310/156.43; 310/156.36
(58) Field of Classification Search ....... 310/156.36–38, 310/53, 56
See application file for complete search history.

(56) References Cited

U.S. PATENT DOCUMENTS

| | | | |
|---|---|---|---|
| 5,990,591 A * | 11/1999 | Yamaguchi et al. | 310/156.53 |
| 6,396,183 B1 * | 5/2002 | Tajima et al. | 310/156.53 |
| 2006/0017343 A1 * | 1/2006 | Ohata et al. | 310/156.43 |
| 2006/0244331 A1 * | 11/2006 | Groening | 310/156.38 |

FOREIGN PATENT DOCUMENTS

| | | |
|---|---|---|
| EP | 1 643 618 | 4/2006 |
| JP | 11-355986 | 12/1999 |
| JP | 2000-350393 | 12/2000 |
| JP | 2003-116235 | 4/2003 |
| JP | 2003-164082 | 6/2003 |
| JP | 2007-60755 | 3/2007 |
| JP | 2007-68357 | 3/2007 |
| JP | 2007-097387 | 4/2007 |

OTHER PUBLICATIONS

US English machine translation of JP 2007-068357, Matsubara et al, Mar. 15, 2007, All pages.*

* cited by examiner

*Primary Examiner* — Quyen Leung
*Assistant Examiner* — Naishadh Desai
(74) *Attorney, Agent, or Firm* — Antonelli, Terry, Stout & Kraus, LLP.

(57) ABSTRACT

Movement of magnets due to centrifugal force is restricted. In a permanent magnet rotating electrical machine 100 having a stator 1 and a rotor core 5 provided with a plurality of permanent magnets 3 inserted in an outer circumferential portion of the rotor 5, each permanent magnet 3 has inclined surfaces on the outer circumferential side of the rotor 2 and the thinnest portions of the inclined surfaces are adjacent to permanent magnets of the opposite polarity. Further, each magnet 3 has a convex-shaped cross section and is divided into two magnet segments 3, 3. A magnetic pole bridge 15 is formed at the boundary of the permanent magnet segments 3, 3. Thus, movement of the permanent magnet segments 3, 3 due to centrifugal force is firmly restricted, and the peeling off of the rotor core 5 and the permanent magnet segments 3, 3 from each other is prevented.

10 Claims, 8 Drawing Sheets

PERMANENT MAGNET ROTATING ELECTRICAL MACHINE AND PERMANENT MAGNET ROTATING ELECTRICAL MACHINE SYSTEM

CROSS-REFERENCE TO RELATED APPLICATION

This application claims the foreign priority benefit under Title 35, United States Code, §119(a)-(d), of Japanese Patent Application No. 2007-182002 filed on Jul. 11, 2007 in the Japan Patent Office, the disclosure of which is herein incorporated by reference in its entirety.

BACKGROUND OF THE INVENTION

1. Field of the Invention

The present invention relates to a permanent magnet rotating electrical machine provided with a rotor having permanent magnets and a stator, and a permanent magnet rotating electrical machine system using the same.

2. Related Art

An induction motor has been employed as a rotating electrical machine to be used for an electric locomotive or vehicle. In recent years, however, low cost of permanent magnets and high performance of semiconductor devices are raising the trend of employing a permanent magnet rotating electrical machine driven by a power conversion system.

In this situation, in order to improve the electrical characteristics of a rotating electrical machine, various types of permanent magnetic rotor structures are considered. For the rotor of a permanent magnet rotating electrical machine disclosed in Japanese Patent Laid-Open Application No. 2003-116235, divided permanent magnet segments are disposed, and flux barriers are arranged behind the divided permanent magnet segments, thereby reducing leakage fluxes to the inside of the rotor to increase the number of flux linkages with the coils of a stator.

[Problem to be Solved]

As the capacities of rotating electrical machines are getting larger, consideration of the mechanical strength of a rotor, which is not a problem for a small-sized machine with a small rotor diameter, is becoming important. Particularly, permanent magnets are often attached to the surface of a rotor core with adhesive, and tend to be peeled off by movement in the radial direction due to a centrifugal force. On the other hand, in order to avoid peeling off of permanent magnets, if plural holes are formed along the axial direction in a circumferential region of a rotor core and permanent magnets are arranged in the holes, the distance between the surface of a permanent magnet and a stator magnetic pole is increased to cause a problem of a drop in magnetic properties. Therefore, it is necessary to achieve both a sufficient mechanical strength of a rotor and magnetic properties.

In this situation, an object of the invention is to provide a permanent magnet rotating electrical machine capable of restricting the movement of permanent magnets due to centrifugal force, and a permanent magnet rotating electrical machine system using the same.

SUMMARY OF THE INVENTION

To address a problem, as described above, the invention provides a permanent magnet rotating electrical machine, including:

a stator; and a rotor with a plurality of permanent magnets insertedly arranged in an outer circumferential region of a rotor core, wherein each permanent magnet has inclined surfaces on an outer circumferential surface side of the rotor, and thinnest portions with respect to the inclined surfaces are adjacent to respective permanent magnets of an opposite polarity.

In this permanent magnet rotating electrical machine, bridges holding the permanent magnets (for example, interpolar bridges and bridge cores on the pole faces) are formed, and these bridges restrict radial movement of the permanent magnets due to the centrifugal force caused by rotation of the rotor. As each of the permanent magnets has inclined surfaces on the outer circumferential surface side and the thinnest portions are adjacent to permanent magnets of the opposite polarity, bridges (for example, an interpolar bridge) adjacent to the thinnest portions are rigid, deformed little, and ensure restriction of movement of permanent magnets. Herein, the inclined surfaces of a permanent magnet refer to surfaces which are inclined with respect to the tangent direction at the magnetic pole center of a single magnetic pole. Further, with a convex cross-section of the permanent magnet, it is possible to have the bridge (for example, a bridge core on the pole face) in the outer circumferential region at the magnetic pole center be thin, which improves the magnetic properties.

According to a first aspect of the invention, it is possible to restrict the movement of permanent magnets due to the centrifugal force. Thus, peeling off between the rotor core and the permanent magnets can be prevented. Further, according to a second aspect of the invention, magnetic properties are improved.

DESCRIPTION OF PREFERRED EMBODIMENTS OF THE INVENTION

Figure 1:
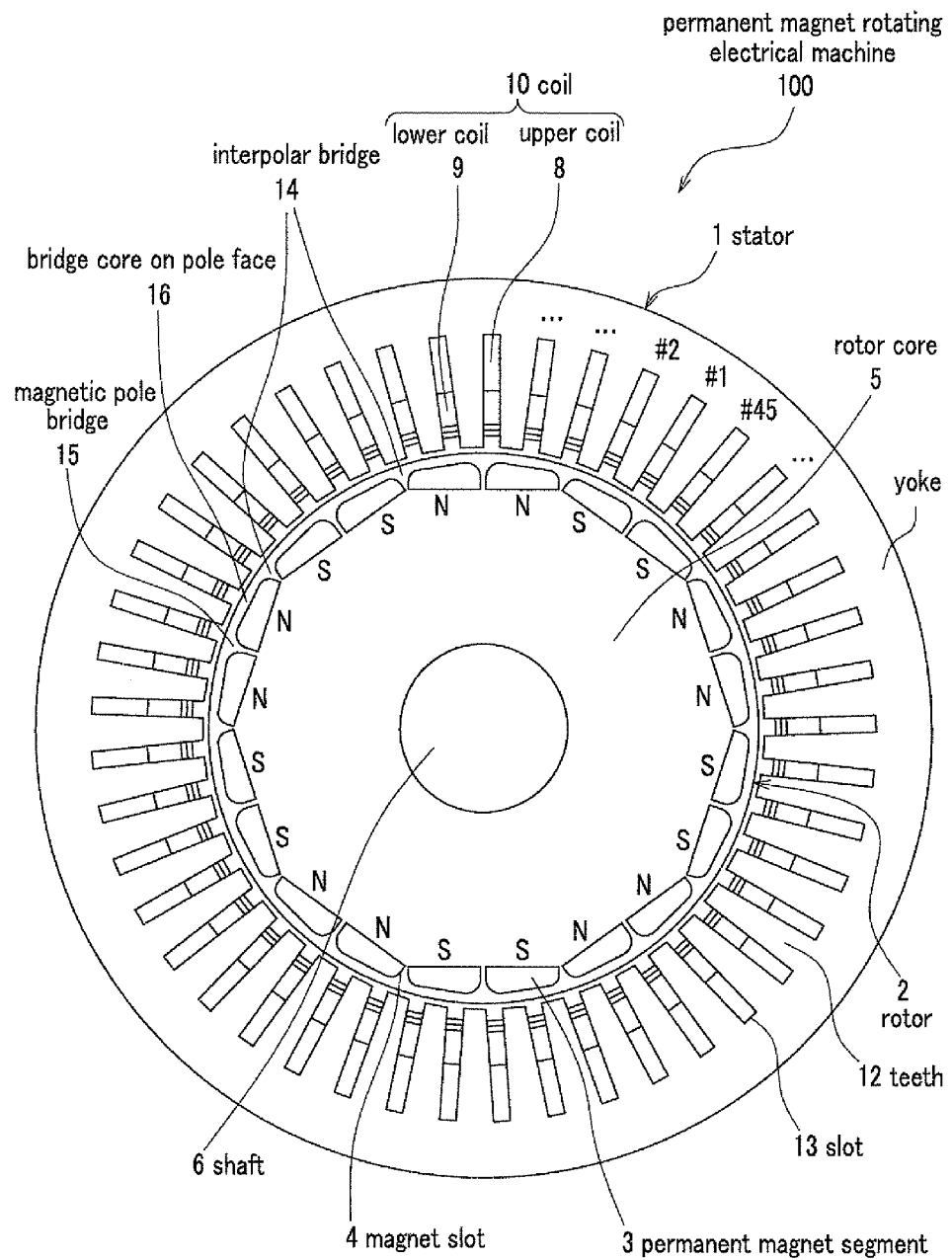
FIG. 1 is a cross-sectional view of a rotating electrical machine in a first embodiment of the invention.

Details of the invention will be described below, referring to the drawings. In each drawing, the same reference numerals are given to the same parts.

(First Embodiment)

FIG. 1 is a cross-sectional view of an end portion of a permanent magnet rotating electrical machine in a first embodiment. A permanent magnet rotating electrical machine 100 is a 10-pole/45-slot rotating electrical machine, used for an electric locomotive or vehicle of a several hundred kW class, and permits a rotational speed of 5000-7000 rpm.

A stator 1 is a distributed winding stator provided with a cylindrical stator core having a plurality of teeth 12 protruding from a yoke to the inner surface, and coils 10 distributedly wound by the use of the teeth 12. The coils 10 are subjected to three-phase winding, namely U-phase, V-phase and W-phase, to electrically form 10 poles with 45 slots. The slots 13 formed between the teeth 12 extending along the axial direction are divided by two as the outer circumferential side and the inner circumferential side, and the coils 10 are arranged such that upper coils 8 are disposed on the outer circumferential side and lower coils 9 are arranged on the inner circumferential side.

Coils 10 are wound in a manner called short pitch winding, which reduces eddy current loss compared with full pitch winding. Each coil 10 is connected such that a wire coming out from a lower coil 9 in slot #1 out of the slot numbers from #1 to #45, which are numbers assigned counterclockwise for the slots 13 for descriptive purposes, goes into the upper coil 8 in slot #5, wherein this connection is repeated in the circumferential direction to form three-phase winding. Herein, the number of slot #5 is a value obtained by dividing the number of slots 45 by the number of poles 10, namely 4.5, and rounding it, resulting in 5. By making the ratio between the winding pitch and the magneticpole pitch (the degree of short pitch) be 5/6, the fifth and seventh space harmonics are reduced. Although in the present embodiment, short pitch winding is adopted, full pitch winding or concentration winding may be adopted in a combination of a different number of poles and a different number of slots. Further, although in the present embodiment, combination of 10 poles and 45 slots is adopted, combination of a different number of poles and a different number of slots may be adopted.

The rotor 2 is rotatably arranged, coaxially with the stator 1. A shaft 6 is fitted into the inner surface of the rotor core 5, and permanent magnet segments 3 are disposed in plural respective magnet slots 4 formed penetrating through the rotor core 5 in the outer circumferential region of the rotor core 5. The permanent magnet segments 3 are arranged such that two magnet segments of the same polarity are provided for a single pole, and 20 magnet segments are arranged in total. Further, by forming plural magnet slots 4 penetrating through the rotor core 5 in the outer circumferential region of the rotor core 5, a magnetic pole bridge 15 is formed at each boundary (the magnetic pole center) between permanent magnet segments 3, 3 of the same polarity arranged in a pair. An interpolar bridge 14 is formed at each boundary between adjacent permanent magnets 3, 3 of opposite polarities. A bridge core 16 on the pole face is formed between interpolar bridges 14 of each permanent magnet 3 (or between an interpolar bridge 14 and a magnetic pole bridge 15), on the outer circumferential side. That is, each permanent magnet 3 is supported by interpolar bridges 14, a magnetic pole bridge 15, and a bridge core 16 on the pole face.

Figure 2:
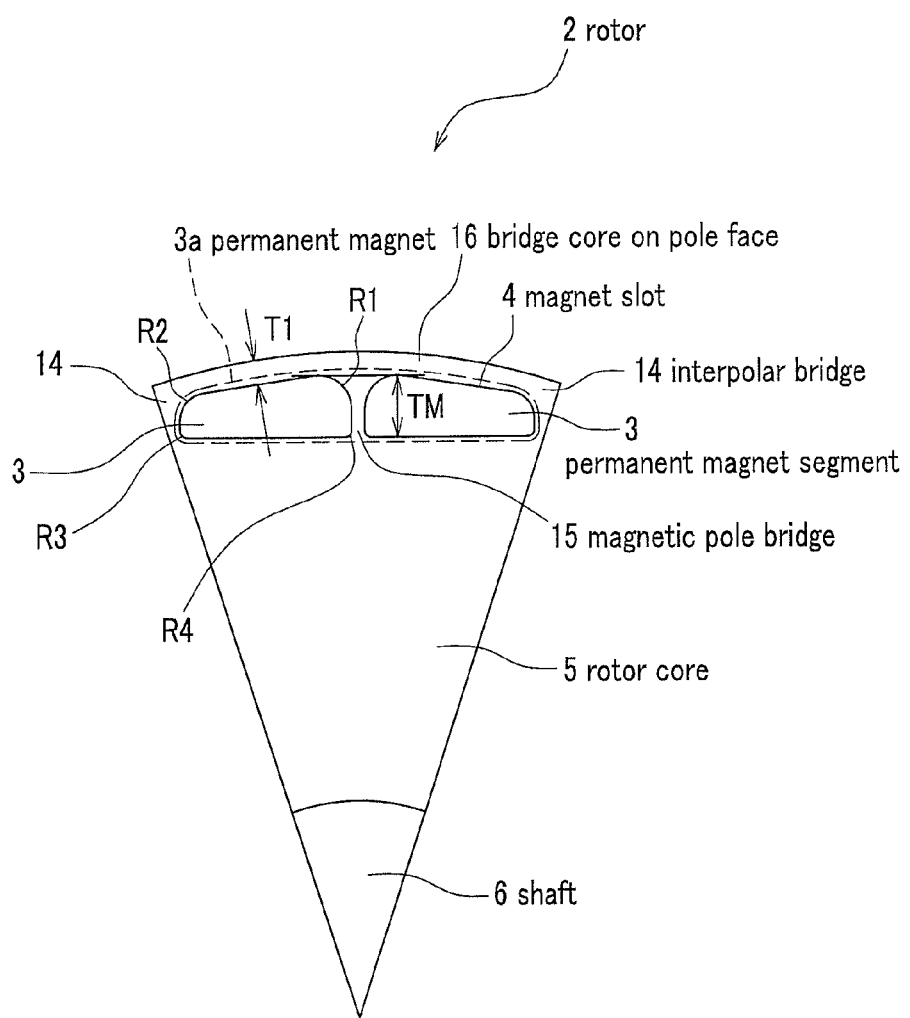
FIG. 2 is a partial enlarged cross-sectional view of the rotating electrical machine in the first embodiment.

FIG. 2 is a partial enlarged view of a portion related to a single magnetic pole of the rotor 2 in the first embodiment. A pair of permanent magnet segments 3, 3 of the same polarity is modeled as a single permanent magnet 3a, shown by dashed lines and curves, and has a shape convexed toward the outer circumference of the rotor at the magnetic pole center (the boundary between permanent magnet segments 3, 3 of the same polarity), being substantially axisymmetric, extending along the circumferential direction from the magnetic pole center. In other words, the permanent magnet segments 3, 3 are two divisions of the permanent magnet 3a and have an inclined surface, the thickness of the cross-sections thereof changing with the circumferential position in the rotor 2. The shape of the inclined surface is a combination of plural lines and plural arcs continuous from the lines, wherein the radii R1 and R2 of the arcs at the corners on the side of the outer circumference of the rotor are larger than the radii R3 and R4 of the arcs at the corners on the side of the inner circumference of the rotor. The permanent magnet 3a has a flat surface on the inner circumference side, and each inclined surface of the permanent magnet 3a is inclined with respect to the tangent direction at the magnetic pole center of a single magnetic pole. The thickness TM of the magnetic pole center portion is larger than that of the thinnest portions on the both ends.

Interpolar bridges 14, 14 are formed and arranged on the both sides of the permanent magnet 3a such that the distance between themselves and the outer circumferential surface of the rotor 2 increases. The thinnest portions of the permanent magnet 3a are adjacent to permanent magnets 3a of the opposite polarity. Both the interpolar bridges 14, 14 and the bridge core 16 on the pole face restrict the movement of the permanent magnet 3a in the radial direction due to the centrifugal force caused by the rotation of the rotor 2, and thus the permanent magnet 3a is prevented from peeling off. Since the permanent magnet 3a has a convex shape, the interpolar bridges 14, 14 have a structure of which width with respect to the circumferential direction becomes larger toward the outer circumference of the rotor 2, thus having a sufficient strength with a high rigidity and resistance against deformation so as to restrict the movement of the permanent magnet 3a. Further, since the permanent magnet 3a has a convex shape, the thickness of the bridge core 16 on the pole face can be made thin in the vicinity of the magnetic pole center (the vicinity of the center of the permanent magnet 3a), and the magnetic properties of the rotating electrical machine 100 are improved.

A magnetic pole bridge 15 is provided between the permanent magnet segments 3, 3 of the same polarity, and restricts the deformation of the bridge core 16 on the pole face due to the centrifugal force at the magnetic pole center.

In FIG. 2, T1 represents the thickness of the bridge core 16 on the pole face between a magnet slot 4 and the outer circumference of the rotor 2, and TM represents the height (thickness) of the thickest portion of a permanent magnet segment 3, which is also the height (thickness) of the thickest portion of apermanent magnet 3a. Each permanent magnet segment 3 is formed to have larger radii R1 and R2 at the respective corners on the outer circumference side of the rotor and smaller radii R3 and R4 at the respective corners on the inner circumference side of the rotor, thereby reducing stress concentration. It is also possible to reduce stress concentration by forming a part of the surface of the permanent magnet on the outer circumference side not in a flat surface but in an arced surface similar to the outer circumference of the rotor 2. Since the permanent magnet 3a is formed with a cross-section in a convex shape, the bridge core 16 on the pole face can be made thin in the vicinity of the magnetic pole center so as to improve the magnetic properties with respect to a magnetic pole of the stator 1.

Figure 3:
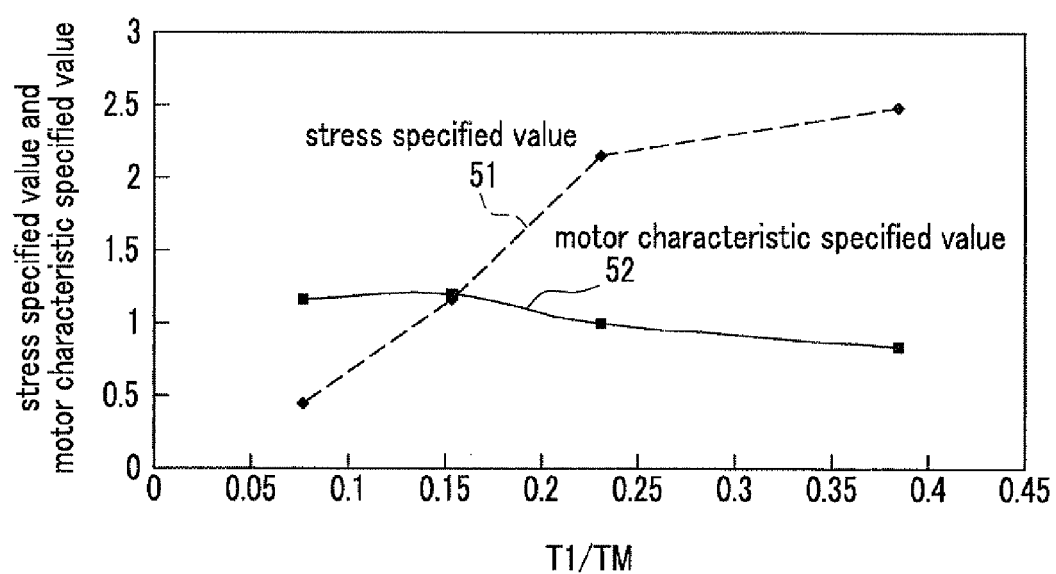
FIG. 3 is a diagram showing the relationship of the stress specified value and the motor characteristic with T1/TM, of the rotating electrical machine in the first embodiment.

In the following, effects of the invention will be described from the viewpoints of stress characteristics and motor characteristics. FIG. 3 shows the relationship between stress specified values and T1/TM, and the relationship between motor characteristic specified values and T1/TM. The horizontal axis represents ratio T1/TM, namely the ratio of the thickness of the bridge core 16 on the pole face to the thickness of the permanent magnet segment 3. Herein, it tends that the thicker the bridge core 16 on the pole face, the higher the stress characteristics and the lower the motor characteristics.

Graph 51 indicates stress specified values, wherein a value satisfying the mechanical strength (for example, a value capable of preventing destruction due to deterioration) is specified to be 1. Graph 52 indicates motor characteristics specified values, having a value satisfying the torque and voltage characteristics required of a motor be 1. In other words, if the respective specified values are greater or equal to 1, a rotating electrical machine can be operated without problems. According to FIG. 3, if T1/TM ratio is greater than or equal to 0.13, the stress specified value is satisfying. If T1/TM ratio is lower than or equal to 0.23, the motor characteristics specified value is satisfying. Accordingly, it is desirable to set the value T1/TM to be in a range of $0.13 \leqq T1/TM \leqq 0.23$.

As has been described above, in accordance with the present embodiment, interpolar bridges 14 and a bridge core 16 on the pole face are formed to hold a permanent magnet 3a, and the bridges 14 and the bridge core 16 on the pole face restrict the permanent magnet 3a from moving in the radial direction due to the centrifugal force of the rotor 2. Further, each permanent magnet 3a has inclined surfaces on the outer circumferential side, and the thinnest portions thereof are adjacent to respective permanent magnets 3a of the opposite polarity. Therefore, the interpolar bridges 14 in the vicinity of the thinnest portions have a high rigidity and resistance against deformation of the bridges so that the permanent magnet is ensured to be restricted from moving. Further, having a pair of permanent magnet segments 3, 3 for a permanent magnet 3a in a shape with a convex cross-section divided into two portions allows it to make the bridge core 16 on the pole face to be thin in the outer circumferential portion in the vicinity of the magnetic pole center, which improves the magnetic properties. Further, by providing the pair of permanent magnet segments 3, 3 between permanent magnets of the opposite polarity, a magnetic pole bridge 15 is formed and the magnetic pole bridge 15 functions to restrict the movement of the permanent magnet segments 3, 3 due to the centrifugal force to a greater extent and functions as a strut further reducing the deformation of the bridge core 16 on the pole face.

Although in the present embodiment, each permanent magnet 3a is divided into two permanent magnet segments 3, 3 and thus the interpolar bridges 14, the magnetic pole bridge 15, and bridge core 16 on the pole face are formed, it is also possible to form the interpolar bridges 14 and the bridge core 16 on the pole face with a single magnet segment 3 substantially axisymmetrically with respect to the magnetic pole center without forming the magnetic pole bridge 15.

(Second Embodiment)

Figure 4:
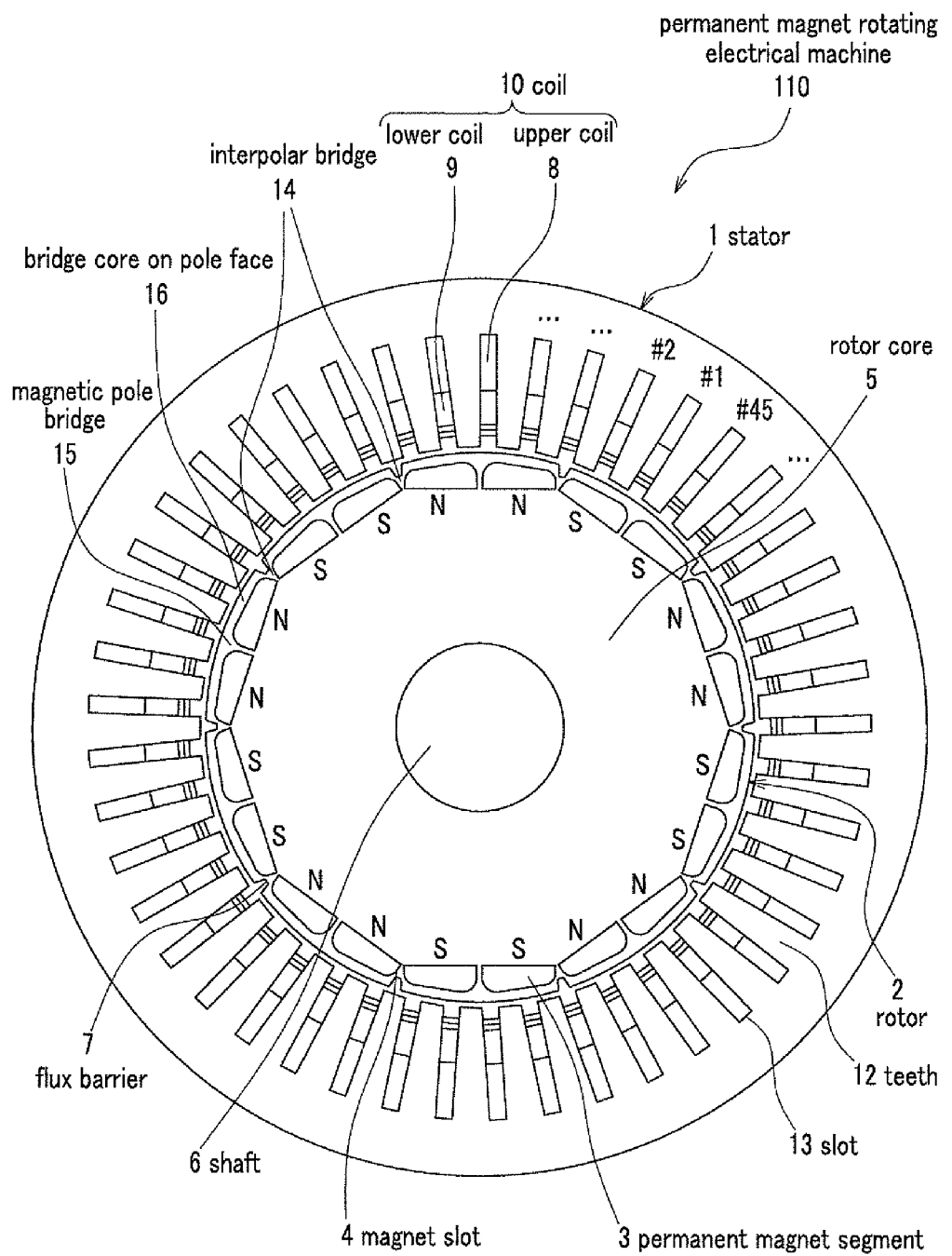
FIG. 4 is a cross-sectional view of a rotating electrical machine in a second embodiment of the invention.

FIG. 4 is a cross-sectional view of an end portion of a permanent magnet rotating electrical machine in a second embodiment of the invention.

A permanent magnet rotating electrical machine 110 is different from the permanent magnet rotating electrical machine 100 in the first embodiment in that recessed flux barriers 7 are provided along the axial direction, between respective magnetic poles of permanent magnets 3a or permanent magnet segments 3 of opposite polarities. These flux barriers 7 prevent magnetic fluxes created by the permanent magnets 3a or permanent magnet segments 3 from flowing to the respective adjacent permanent magnets 3a or permanent magnet segments 3 of the opposite polarity, so that the fluxes flow to magnetic poles of the stator 1.

Figure 5:
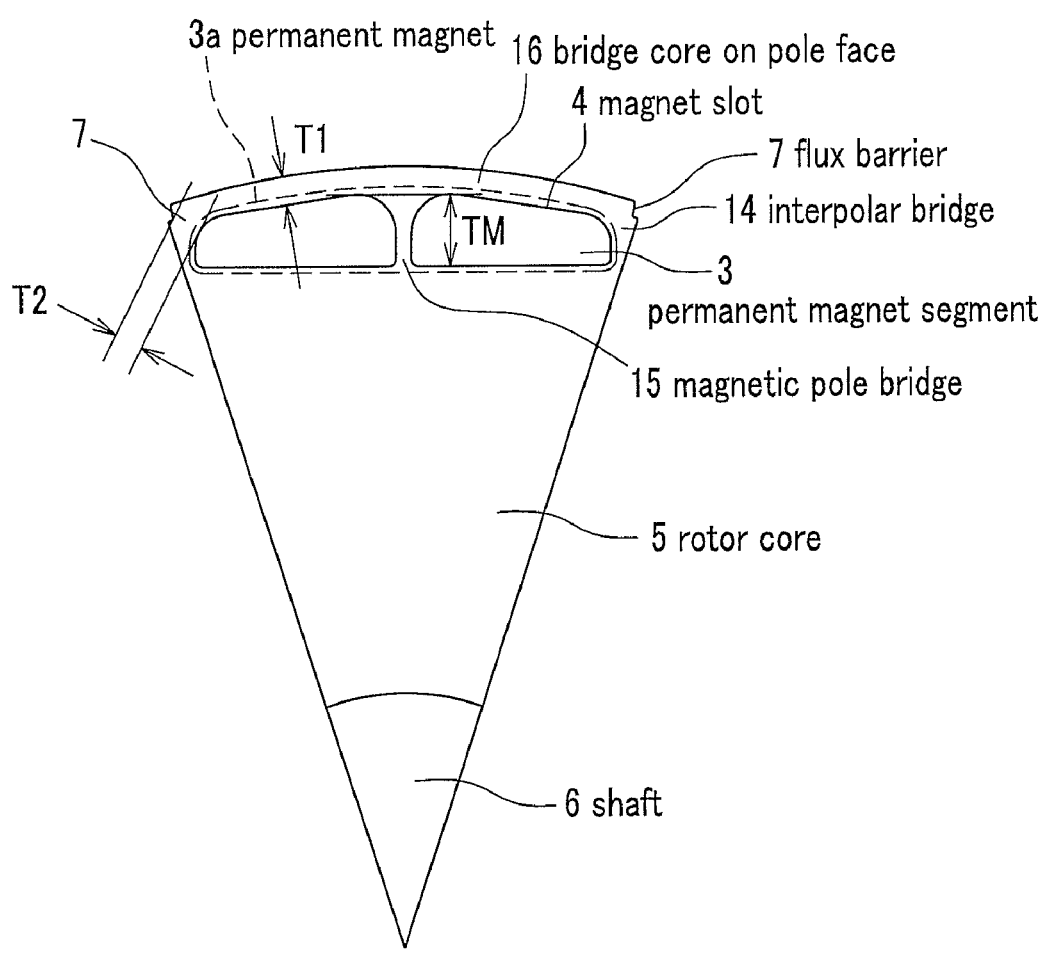
FIG. 5 is a partial enlarged cross-sectional view of the rotating electrical machine in the second embodiment.

FIG. 5 is a partial enlarged view of a portion related to a single magnetic pole arranged on the rotor 2 in the second embodiment. The same as in FIG. 2, T1 represents the thickness of the bridge core 16 on the pole face, in other words, the distance between a magnet slot 4 and the outer circumference of the rotor 2, and TM represents the height (thickness) of the thickest portion of a permanent magnet segment 3. Further, T2 represents the width of the narrowest portion between a flux barrier 7 and a permanent magnet 3.

Figure 6:
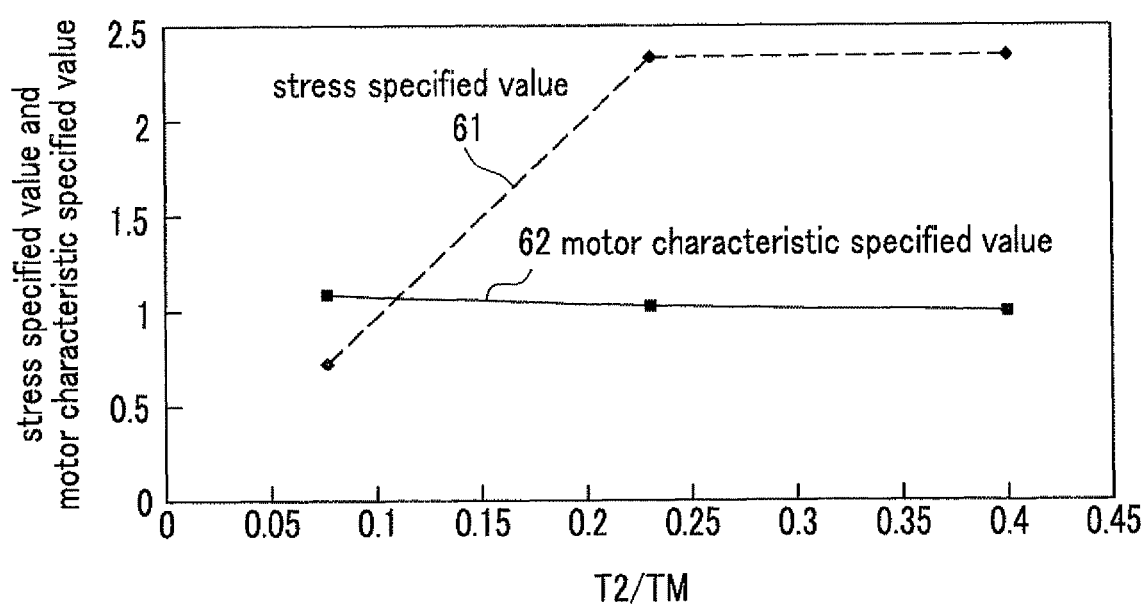
FIG. 6 is a diagram showing the relationship of the stress specified value and the motor characteristic with T1/TM of the rotating electrical machine in the second embodiment.

FIG. 6 shows the relationship between stress specified values and T2/TM, and the relationship between motor characteristic specified values and T2/TM. The same as in FIG. 3, graph 61 indicates stress specified values, wherein a value satisfying the mechanical strength is specified to be 1. Graph 62 indicates motor characteristics specified values, having a value satisfying the torque and voltage characteristics required of a rotating electrical machine be 1. In other words, if the respective specified values are greater or equal to 1, a rotating electrical machine can be operated without problems. Accordingly, if ratio T2/TM is greater than or equal to 0.1, the stress specified value is satisfying. If ratio T2/TM is lower than or equal to 0.4, the motor characteristics specified value is satisfying. Accordingly, it is desirable to set the value T2/TM to be in a range of $0.1 \leqq T2/TM \leqq 0.4$.

(Third Embodiment)

Figure 7:
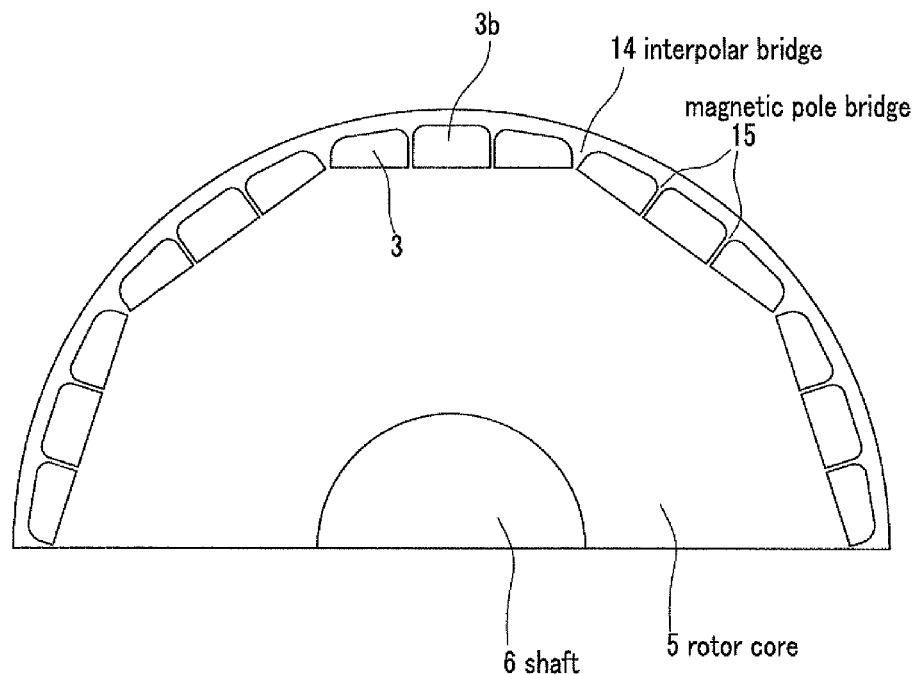
FIG. 7 is a view showing a rotor core in a case where one permanent magnet is divided into three permanent magnet segments.
Figure 8:
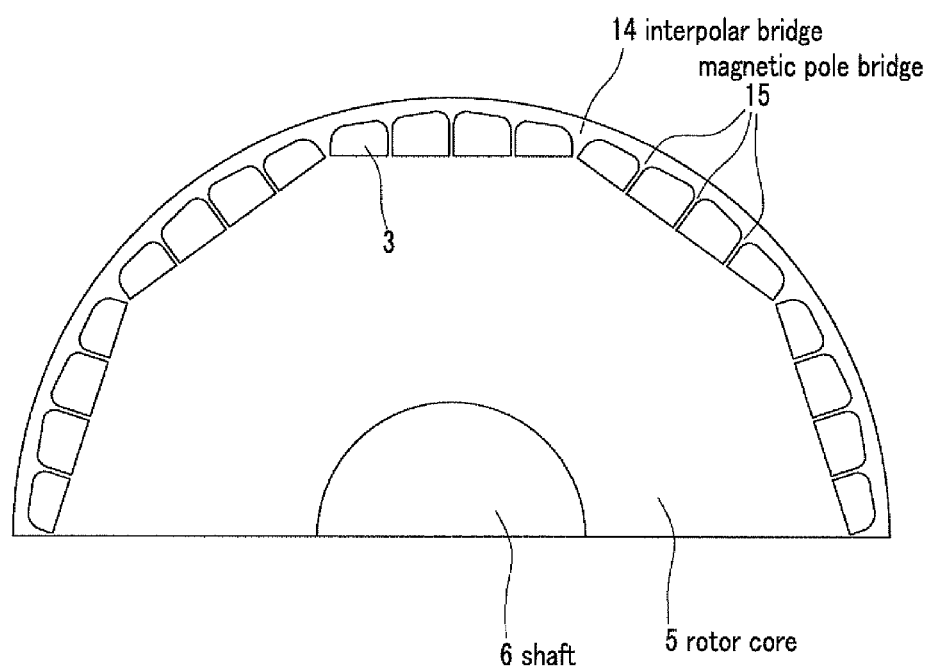
FIG. 8 is a view showing a rotor core in a case where one permanent magnet is divided into four permanent magnet segments.

In the rotor structures described in First and Second Embodiments, a permanent magnet 3a is divided into two segments (as shown in FIG. 2), and provided with a single magnetic pole bridge 15. However, as shown in FIGS. 7 and 8, a permanent magnet 3a may be divided into three or four permanent magnet segments 3 so that two or three magnetic pole bridges 15 are formed. Thus, a bridge core 16 on the pole faces (FIG. 1) can be further restricted from deformation.

EXAMPLES

Figure 9:
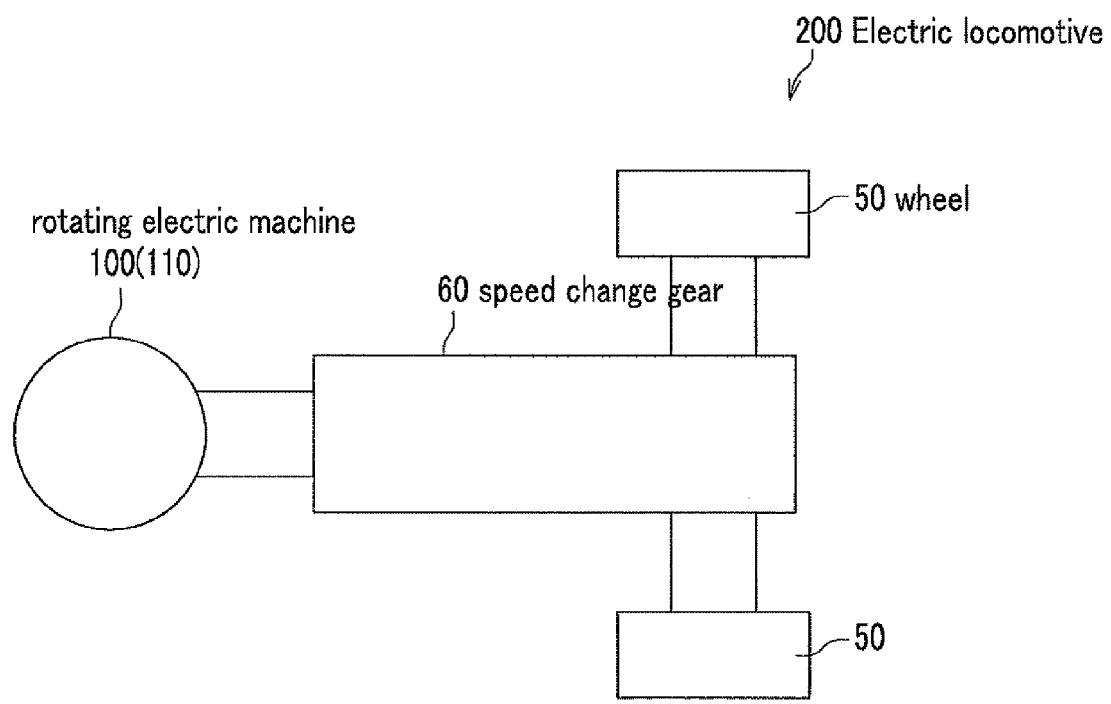
FIG. 9 is a diagram of an example in which wheels of an electric locomotive or vehicle are driven, using a rotating electrical machine in accordance with the invention.

FIG. 9 shows an example of a permanent magnet rotating electrical machine system for an electric locomotive or vehicle to which a rotating electrical machine 100 or 110 in the present embodiment is applied. An electric locomotive or vehicle 200 is provided with a rotating electrical machine 100 or 110 described in First or Second Embodiment, a speed change gear 60, and wheels 50, wherein the rotating electrical machine 100 or 110 drives the wheels 50 via the speed change gear 60.

Figure 10:
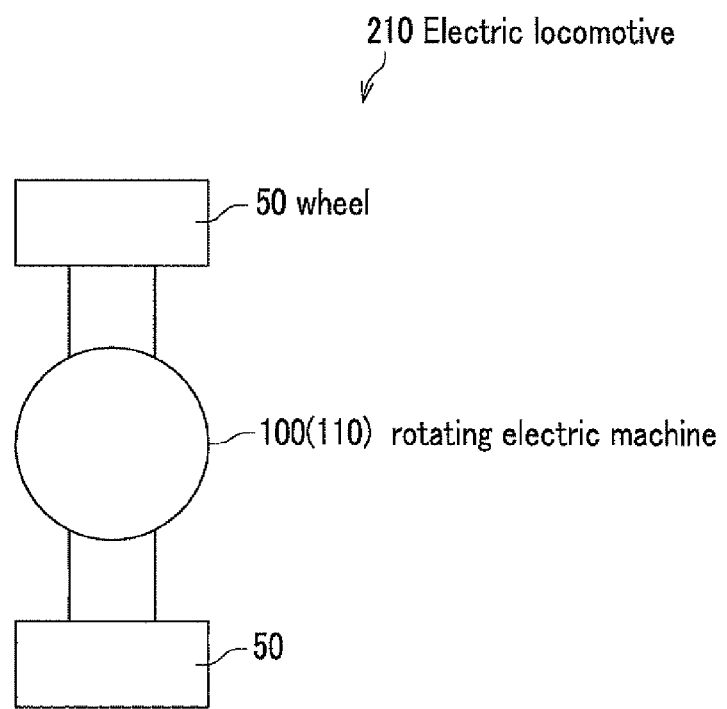
FIG. 10 is a diagram of an example of connecting a rotating electrical machine in accordance with the invention directly with wheels of an electric locomotive or vehicle.

Further, as the electric locomotive or vehicle 210 shown in FIG. 10, the wheels 50 may be directly connected with the rotating electrical machine 100 or 110, on the both sides with respect to the axial direction of the shaft. Still further, the rotating electrical machine 100 or 110 is sufficiently applicable, as a driving power source, to a permanent magnet rotating electrical machine system for blowing, such as a fan or pump.

Modified Example

The invention is not limited to the above embodiments, and allows various modifications with examples as follows.

(1) Although the rotor inner circumference side of each permanent magnet segment 3 is shaped to be a flat surface in the above respective embodiments, a different shape may be formed.

(2) Although in the above respective embodiments, a bridge core 16 on a pole face connects interpolar bridges 14, or connect an interpolar bridge and a magnetic pole bridge 15, the bridge core 16 on the pole face may not connect them in the vicinity of the magnetic pole. Thus, the distance between permanent magnet segments 3 and the stator 1 can be reduced, which improves the magnetic properties. Particularly, when dividing a permanent magnet 3a into an odd number of segments, since the center permanent magnet becomes closer to a magnetic pole of the stator 1, the magnetic properties are improved more effectively. In this case also, it is necessary to insert a central permanent magnet, in other words, to hold a permanent magnet segment 3b (in FIG. 7) by a part of a bridge core 16 on the pole face.

What is claimed is:

1. A permanent magnet rotating electrical machine, comprising:
   a stator; and
   a rotor with a plurality of permanent magnets insertedly arranged in an outer circumferential region of a rotor core,
   wherein each permanent magnet has inclined surfaces on an outer circumferential surface side of the rotor, and thinnest portions adjacent to respective permanent magnets of an opposite polarity,
   wherein each permanent magnet has a convex-shaped cross-section,
   wherein each permanent magnet has a cross section comprising a combination of plural lines and plural arcs continuous from the lines; and
   wherein each corner of each permanent magnet is formed only of an arc on the outer circumference side and on an inner circumference side of the rotor and radii of the arcs at corners on the outer circumference side of the rotor are larger than radii of the arcs at corners on the inner circumference side of the rotor.

2. The permanent magnet rotating electrical machine of claim 1, wherein each permanent magnet is divided with respect to a circumferential direction into plural magnet segments being magnetized in a same polarity.

3. The permanent magnet rotating electrical machine of claim 2, wherein a magnetic pole bridge is formed each between each of the plural magnet segments.

4. The permanent magnet rotating electrical machine of claim 1, wherein the rotor core is provided with interpolar bridges formed with variation in a distance between the respective inclined surfaces and an outer circumferential surface of the rotor.

5. The permanent magnet rotating electrical machine of claim 4, wherein:
   the rotor core is formed with a bridge core on a pole face of each permanent magnet, between the interpolar bridges, the pole face being on the outer circumferential side of the rotor; and $0.13 \leq T1/TM \leq 0.23$ where TM represents a thickness of a thickest portion of the permanent magnet, and T1 represents a thickness of the bridge core on the pole face.

6. The permanent magnet rotating electrical machine of claim 1, wherein the stator is formed with a plurality of teeth protruding from a yoke to an inner surface thereof, and coils are wound by concentrated winding or distributed winding around the teeth.

7. The permanent magnet rotating electrical machine of claim 1, wherein the rotor core is formed with recessed flux barriers between the permanent magnets of opposite polarities.

8. The permanent magnet rotating electrical machine of claim 7, wherein $0.1 \leq T2/TM \leq 0.4$ where T2 represents a smallest width between the flux barriers and the permanent magnets, and TM represents a height of a thickest portion of the permanent magnets.

9. A permanent magnet rotating electrical system for an electric locomotive or vehicle, wherein the permanent magnet rotating electrical machine of claim 1 is employed as a driving power source.

10. A permanent magnet rotating electrical system for a blower, wherein the permanent magnet rotating electrical machine of claim 1 is employed as a driving power source.

* * * * *